(12) United States Patent
Diaz et al.

(10) Patent No.: US 6,945,569 B1
(45) Date of Patent: Sep. 20, 2005

(54) ENHANCED DURABILITY HAMMER UNION

(75) Inventors: Juan M. Diaz, Plano, TX (US); Mark D. Matzner, Burleson, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 0 days.

(21) Appl. No.: 10/833,859

(22) Filed: Apr. 28, 2004

(51) Int. Cl.⁷ .............................................. F16L 35/00
(52) U.S. Cl. .................... 285/388; 285/354; 285/334.5
(58) Field of Search ................................ 285/388, 354, 285/334.5

(56) References Cited

U.S. PATENT DOCUMENTS

| | | | | |
|---|---|---|---|---|
| 1,201,022 A | * | 10/1916 | Conniff | 411/432 |
| 1,675,808 A | * | 7/1928 | Kliss | 285/388 |
| 2,310,813 A | * | 2/1943 | Sellmeyer | 269/297 |
| 2,391,266 A | * | 12/1945 | Parker | 285/116 |
| 2,404,142 A | * | 7/1946 | Parker | 285/114 |
| 3,024,047 A | * | 3/1962 | Schmohl | 285/332.2 |
| 3,113,792 A | * | 12/1963 | Brown | 285/354 |
| 3,160,426 A | * | 12/1964 | Faeser | 285/95 |
| 3,294,425 A | * | 12/1966 | Franck | 285/334.5 |
| 4,150,847 A | * | 4/1979 | De Cenzo | 285/93 |
| 4,705,306 A | * | 11/1987 | Guido et al. | 285/332 |
| 5,791,693 A | * | 8/1998 | Crawford | 285/23 |
| 2002/0185867 A1 | * | 12/2002 | Stachowiak | 285/354 |

* cited by examiner

Primary Examiner—Eric K. Nicholson
(74) Attorney, Agent, or Firm—Bracewell & Giuliani LLP

(57) ABSTRACT

A union for connecting two tubular members. The first tubular member has an external flange, and the second tubular member has a set of external threads. An annular nut surrounds the first tubular member. The nut has an internal flange that surrounds the first tubular member, and a set of threads to engage the threads of the second tubular member. Arcuate segments are circumferentially mated between the internal flange of the nut and the external flange of the first tubular member. A flat conical surface on the inner side of the segment comes into contact with a flat conical surface on the outer side of the external flange. Curved conical surfaces tangentially align with and extend from the flat conical surfaces on the segment and the external flange. Cylindrical surfaces tangentially align and join the curved conical surfaces on the segment and the tubular member.

13 Claims, 3 Drawing Sheets

ENHANCED DURABILITY HAMMER UNION

1. FIELD OF THE INVENTION

This invention relates generally to unions for connecting conduits, and relates more particularly to pressure transmitting hammer unions, which enable two coaxial sections of conduit to be connected without rotating the conduit sections.

2. BACKGROUND OF THE INVENTION

A pipe union for interconnecting two coaxial pipe ends is often utilized to transmit fluid under pressure during oilfield service operations. Typical high-pressure operations include mud logging, cementing, fracing, acidizing, nitrogen pumping, and other upstream well servicing applications.

One such coupling apparatus for connecting two pipe ends in an oilfield flowline is a clamp-type union connection positioned at the pipe joint. A clamp surrounds the adjacent ends of the two lengths of pipe to be interconnected. The clamp is tightened around the ends of the pipe lengths by associated wing nuts and bolts, and the individual pipe sections are drawn axially toward one another, compressing a seal located in between to complete the joint. Clamp-type couplings, however, take considerable time to install and replace, and are therefore only appropriate in relatively permanent installations.

Another common apparatus for high-pressure flow transmission at a pipe joint is a threaded hammer union, which allows two coaxial threaded sections of pipe to be connected without rotating the pipe sections. Hammer unions allow pipeline couplings to be quickly and easily effected or released, and are effective under high-pressure conditions. As such, hammer unions are often used in flowline rigging when working pressure conditions can approach 15,000 psi. The nut of the hammer union is screwed onto the external thread, drawing the connecting pipe sections axially toward one another, and compressing a sealing ring to complete the proper connection.

Conventional hammer unions have been made from a wing nut, wing nut segments, male and female ends, and a segment retainer ring. One prior art hammer union, illustrated in FIG. 1, features a 90 degree angle at the contact interface between the male end 3, the wing nut segments 4, and the wing nut 5. Such known hammer unions have performed well in many applications. There are some applications, however, where the cyclic nature of the loading is so severe that fatigue failure is possible.

Another prior art hammer union, illustrated in FIG. 2, features a 45 degree shoulder at the contact interface between the male end 6, the wing nut segments 7, and the wing nut 8. Although this configuration offered better fatigue resistant properties than the 90 degree configuration, the 45 degree shoulder design introduced unwanted inward radial stresses on the male end which were not present with the 90 degree configuration.

Therefore, where cyclic loading comprises a significant part of a particular application of a hammer union, a new and improved hammer union is desirable which reduces inward radial stresses and stress concentration levels on the hammer union, thus improving performance and reliability of the hammer union component parts.

3. SUMMARY

This invention includes a hammer union to connect two tubular members. The first tubular member has an external flange protruding therefrom, and the second tubular member has a set of external threads on its outer surface. An annular nut surrounds the first tubular member. The nut has an internal flange that surrounds the first tubular member, and a set of threads to engage the corresponding threads of the second tubular member. At least one arcuate segment is circumferentially mated between the internal flange of the nut and the external flange of the first tubular member.

A first flat conical surface on the inner side of the segment comes into contact with a second flat conical surface on the outer side of the external flange. The flat conical surfaces appear flat when viewed in cross-section. A first curved conical surface has one end tangentially aligned with and extending from the flat conical surface on the inner side of the segment, and has another end tangentially aligned with and joins an inner cylindrical surface of the segment. A second curved conical surface has one end tangentially aligned with and extending from the flat conical surface on the external flange, and has another end tangentially aligned with and joins an outer cylindrical surface of the first tubular member. At least a portion of the curved conical surfaces is separated by a clearance.

The novel features of this invention, as well as the invention itself, will best be understood from the following drawings and detailed description.

4. BRIEF DESCRIPTION OF THE DRAWINGS

5. DETAILED DESCRIPTION OF THE INVENTION

Figure 2:
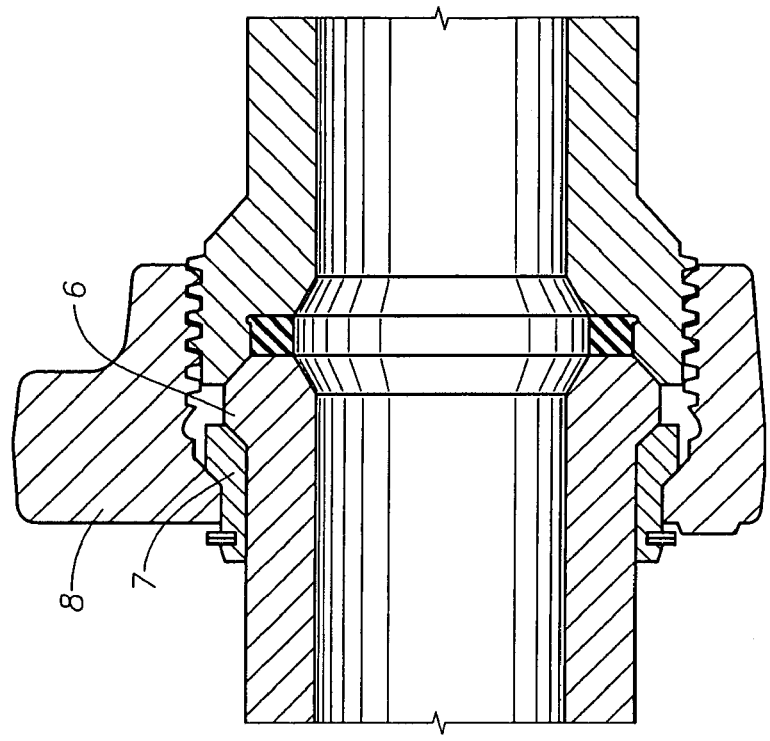
FIG. 2 depicts a longitudinal sectional view of a prior art version of a hammer union, showing a wing nut segment with a 45 degree angle.
Figure 1:
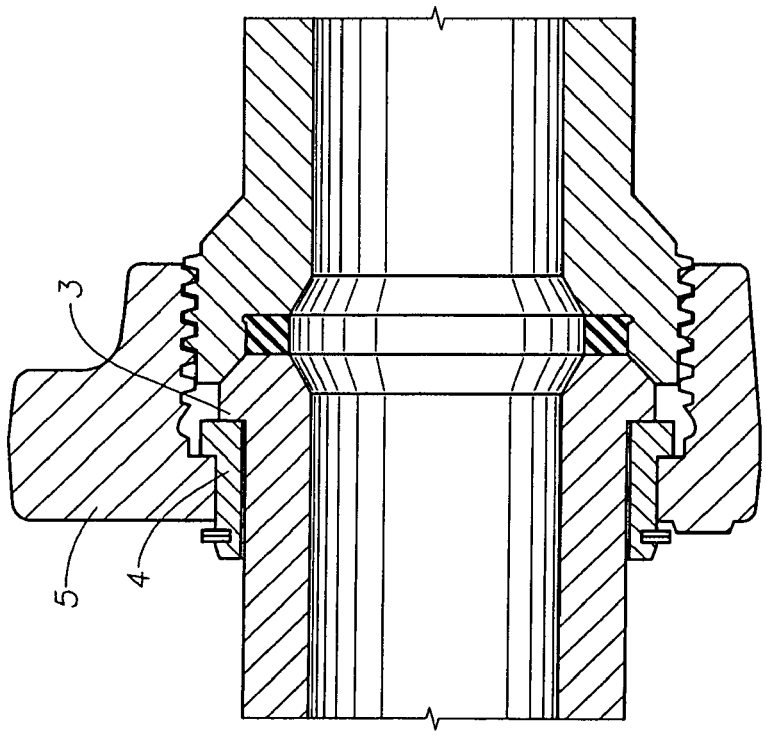
FIG. 1 depicts a longitudinal sectional view of a prior art version of a hammer union, showing a wing nut segment with a 90 degree angle.

Although the following detailed description contains many specific details for purposes of illustration, anyone of ordinary skill in the art will appreciate that many variations and alterations to the following details are within the scope of the invention. Accordingly, the exemplary embodiment of the invention described below is set forth without any loss of generality to, and without imposing limitations thereon, the claimed invention.

The hammer union 10 of the present invention is a flowline apparatus that joins two conduit sections 19 and 21. The conduit sections 19 and 21 are tubular in shape, and preferably include one threaded conduit section 21 and one non-threaded conduit section 19. The union 10 includes a threaded wing nut 15 for receiving and engaging the threaded conduit section 21.

Figure 4:
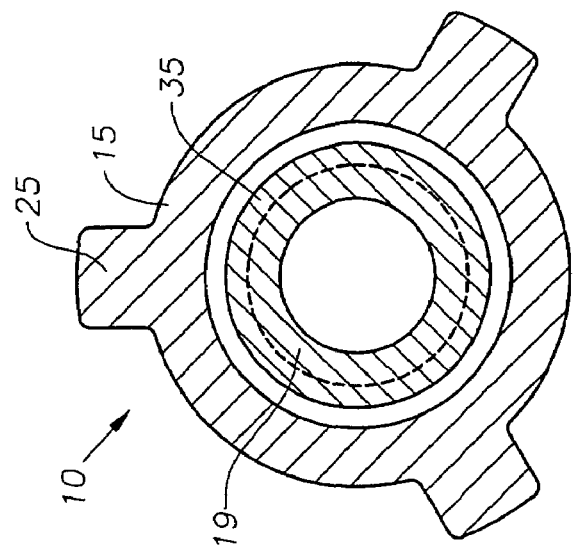
FIG. 4 shows a sectional view of the hammer union of FIG. 3, taken along the line 4—4 of FIG. 3.
Figure 3:
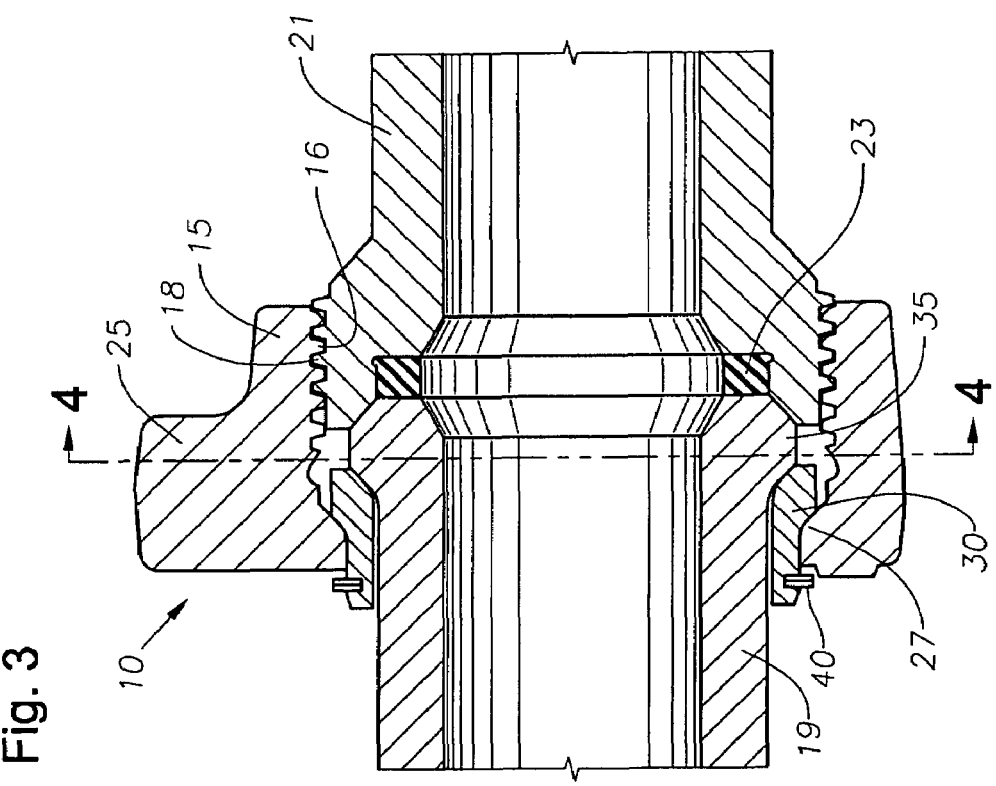
FIG. 3 depicts a longitudinal sectional view of a hammer union according to the invention.

As shown in FIGS. 3 and 4, the wing nut 15 surrounds and encases the end portions of the conduit sections 19 and 21 to be joined. In this manner, the wing nut 15 operates as the female part, and the conduit ends 19 and 21 operate as the male parts. The wing nut 15 of the union 10 is annular in shape, and an inner portion of the wing nut 15 has threads 16 to receive and engage corresponding threads 18 on the outer side of the threaded conduit section 21. The threads 16 and 18 allow the wing nut 15 to rotate around the threaded conduit section 21 in order to tighten the joint between the individual sections of conduit 19 and 21.

The wing nut 15 has several lugs 25 protruding radially outward from the wing nut 15. In the preferred embodiment, the wing nut 15 has three protruding lugs 25. The wing nut 15 and corresponding lugs 25 are made from a material having great strength and toughness, such as steel or an otherwise hard metal. The lugs 25 should have an especially high toughness sufficient to withstand the force and impact of a hammer strike used to tighten the wing nut 15 around the individual sections of conduit 19 and 21. The wing nut 15 is designed so that when the lugs 25 are hammered and the wing nut 15 rotates around the conduit sections 19 and 21, the threaded conduit section 21 contacts and abuts against the non-threaded conduit section 19 to complete the union joint. A seal 23 is located between the end portions of conduit sections 19 and 21. Conduits 19 and 21 may be pipes, each having a threaded end and a non-threaded end. Alternatively, they may be portions of valves, adapters, T-conduits, or other flowline conduits.

Figure 5:
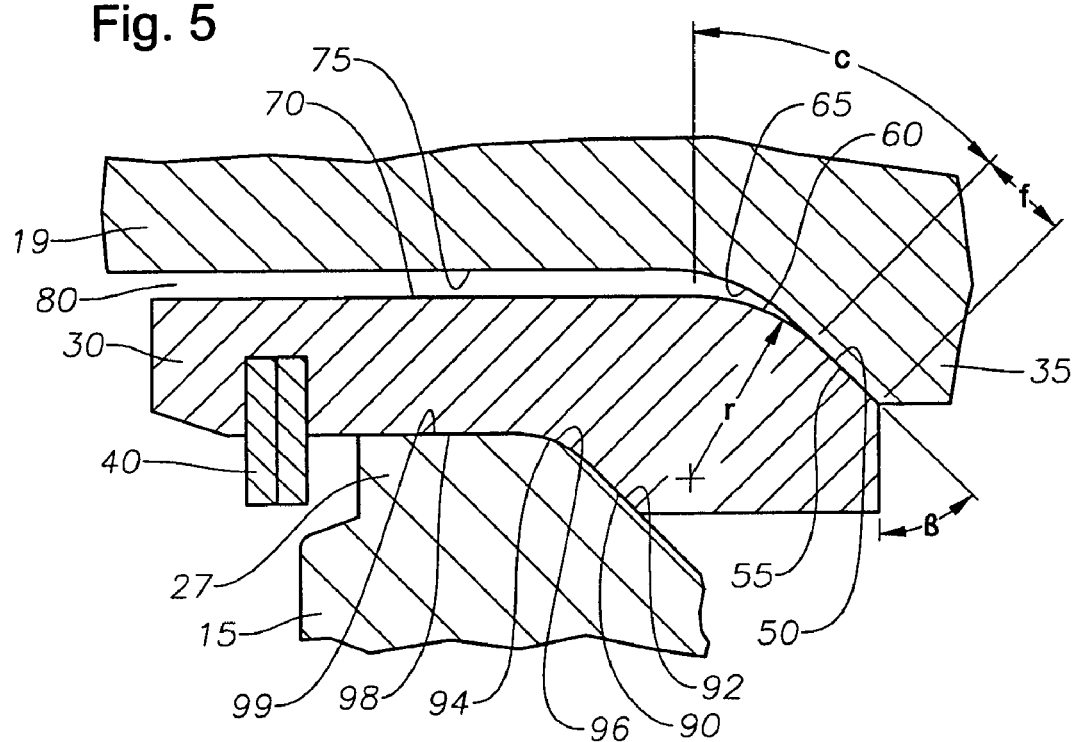
FIG. 5 depicts an enlarged sectional view of a portion of the hammer union of FIG. 3.

As shown in FIG. 3 and FIG. 5, an annular internal flange 27 protrudes radially inward from the wing nut 15. The internal flange 27 of the wing nut 15 surrounds the non-threaded conduit section 19. At least one and preferably a plurality of wing nut segments 30 are removably attached to the internal flange 27 of the wing nut 15. Typically, there are three wing nut segments 30, each extending 120 degrees. The wing nut segments 30 are typically in the form of an arcuate segmentss that in operation are circumferentially mated between the internal flange 27 of the wing nut 15 and an external flange 35 on the non-threaded conduit section 19.

An annular retainer ring 40 is mounted on the wing nut segments 30 to secure the wing nut segments 30 in place between the wing nut 15 and the non-threaded conduit section 19. The retainer ring 40 is mounted on an outer portion of the wing nut segments 30 farthest from where the individual conduit sections 19 and 21 are joined. The retainer ring 40 resiliently snaps into a recess in the wing nut segments 30, and protrudes radially outward from the wing nut segments 30 adjacent to where the wing nut 15 interfaces the wing nut segments 30.

The wing nut segments 30 are operationally designed to axially contact annular external flange 35 on the non-threaded conduit section 19 that protrudes radially outward from the non-threaded conduit section 19. The contact occurs as the hammer union 10 is mounted around the two conduit sections 19 and 21, and after the hammer union 10 is screwed around the threaded conduit section 21, thus joining the two conduit sections 19 and 21 together.

A portion of the wing nut segments 30 axially contacts the external flange 35 of the non-threaded conduit section 19. Referring to FIG. 3, a flat conical surface 50 on an inner side of the wing nut segments 30 contacts a mating flat conical surface 55 on an outer side of the external flange 35. As shown in FIG. 5, the surfaces 50 and 55 are flat when viewed in cross-section but are conical in application. The lineal distance or lineal extent "f" of the flat contact interface between surfaces 50 and 55 is desired to be as short in length as possible, but the length "f" must be adequate to support axial loads. The lineal extent "f" is a constant value for a given conduit diameter. For example, the lineal extent of the flat contact interface "f" may be 0.17 inches for a hammer union 10 operating on 3 inch diameter conduits 19 and 21. If the conduits 19 and 21 have a 4 inch diameter, the value for "f" may have a different value.

A curved conical surface 60 on the inner side of the wing nut segments 30 tangentially aligns with and extends from the flat conical surface 50 on the inner side of the wing nut segments 30. The curved conical surface 60 has another end tangentially aligned with and joins an inner cylindrical surface 70 on the inner side of the wing nut segments 30. Similarly, there is a curved conical surface 65 on the external flange 35 that tangentially aligns with and extends from the flat conical surface 55 on the external flange 35. The curved conical surface 65 has another end tangentially aligned with and joins an inner cylindrical surface 75 an outer cylindrical surface of the non-threaded conduit 19. The lineal distance or lineal extent "c" of the curved conical surface 60 of the wing nut segments 30 are the circumferential distance of the curved portion of the wing nut segments 30 when viewed in cross section. The lineal extent "c" of the curved conical surface 60 of the wing nut segments 30 are preferably greater than the lineal extent "f" of the flat conical surfaces 50 and 55.

The outer side of the wing nut segments 30 has a shape congruent with the corresponding shape of the internal flange 27 of the wing nut 15. A flat conical surface 90 on an outer side of the wing nut segments 30 are in mating contact with a flat conical surface 92 on the inner side of the internal flange 27. As shown in FIG. 5, the flat conical surfaces 90 and 92 are flat when viewed in cross-section. A curved conical surface 94 tangentially aligns and extends from the flat conical surface 90 on the outer side of the wing nut segments 30. The other end of the curved conical surface 94 is tangentially aligned with and joins an outer cylindrical surface 98 on the wing nut segments 30. On the internal flange 27, a curved conical surface 96 tangentially aligns and extends from the flat conical surface 92 on the internal flange. The other end of the curved conical surface 96 is tangentially aligned with and joins an inner cylindrical surface 99 on the internal flange 27.

In the preferred embodiment, only the flat surfaces 50 and 55 form the contact interface between the external flange 35 and the wing nut segments 30. The curved surfaces 60 and 65 come into close proximity with one another but preferably do not touch or contact each other. Therefore, a clearance 80 of open space exists between the curved surfaces 60 and 65, as well as between the cylindrical surfaces 70 and 75. Alternative embodiments may exist where not only the flat surfaces 50 and 55 form the contact interface, but also at least a portion of the curved surfaces 60 and 65 contact each other to form an extended contact interface. In this alternative embodiment, the clearance 80 would still exist between the cylindrical surfaces 70 and 75, and may exist between a portion of the curved surfaces 60 and 65.

As shown in FIG. 5, an acute angle B is established between the flat conical surfaces 50 and 55 and a plane perpendicular to an axis of the tubular conduit members 19 and 21. When viewed in cross-section, the curved conical surface 60 of the wing nut segments 30 are of a circular character with a radius "r."

For any given length of the flat conical surfaces 50 and 55 on the wing nut segments 30, the radius "r" is dependent on the angle B. In the preferred embodiment, the radius "r" is dependent upon a value "k" multiplied by lineal extent "f" and divided by the quantity of 1 minus the sine of angle B. Thus, the radius "r" is a function of the angle B, and the radius "r" tends to increase as the value for the angle B increases. The value for "k" may have many alternative values, but the value for "k" in the preferred embodiment is dependent upon (although not necessarily equal to) the value corresponding to the diameter of the point of the lineal surface "f" that is closest to the axis of conduit 19 minus the diameter of conduit 19. The value for "f" may have many alternative values, but the value for "f" in the preferred embodiment is dependent upon (although not necessarily equal to) the diameter of conduit 19.

For example, with respect to a 3 inch diameter for conduits 19 and 21, if the constant "k" is equal to one, and if the flat surfaces 50 and 55 are of a distance or lineal extent "f" that is approximately 0.17 inches, and if the angle B is approximately 30 degrees, the corresponding radius "r" is approximately equal to 0.34 inches. Preferably the angle B is less than 45 degrees, and in the preferred embodiment shown in FIG. 5 the angle B is specifically 30 degrees, but the acute angle B must be less than 90 degrees. The aforementioned parameters correspond to a pipe joint union 10 for a 3 inch pipe, but some parameters such as "k" and "f" may differ when alternatively applied to many other sizes of conduits, such as 2 inch or 4 inch pipes. It should be well understood to those skilled in the art that the values for "k" and "f" are constant values that may be changed depending on the circumstances such as the diameter of conduit 19, but when determining the value for "r" in regard to a variable angle B for a given conduit diameter, the values for "k" and "f" should be constant when applying varying angles for angle B.

In operation, the hammer union 10 is placed around both conduit ends 19 and 21, and by forcibly impacting the lugs 25 on the wing nut 15 in a circumferential manner, the operator rotates the wing nut 15 by rotating the lugs 25 on the wing nut 15. In this manner, the threads 16 on the inner side of the threaded wing nut 15 are rotated into engagement with external threads 18. As the wing nut 15 is rotated, the threaded conduit section 21 and the non-threaded conduit section 19 approach each other until both conduit ends 19 and 21 form an interface flush against each other.

The operator continues to rotate the wing nut 15 around the threads in the threaded conduit section 21. This procedure then effectuates an axial movement of both the threaded conduit section 21 and the non-threaded conduit section 19 in the same direction, until the non-threaded conduit section 19 contacts the wing nut segments 30 as the hammer union 10 tightens. In this manner, the flat conical surface 55 on the outer side of the external flange 35 of the non-threaded conduit section 19 contacts the flat conical surface 50 on the inner side of the wing nut segments 30, forming a flat-to-flat contact interface of lineal distance "f." The operator continues to rotate the wing nut 15 until met with substantial resistance, arising from the inability of the conduit sections 19 and 21 to move farther axially after the non-threaded conduit section 19 axially contacts the wing nut segments 30.

The invention is most advantageous with regard to hammer union applications where cyclic loading is significant. The invention leads to a decrease in the associated stress concentration on the wing nut segments, and thus less deformation of the wing nut segments. Further, because the invention utilizes a 30 degree angle rather than a 45 degree angle of prior versions, the invention results in less inward radial stresses on the conduit. Ultimately, the present invention provides for greater performance and reliability of the wing nut, the wing nut segments, conduit sections, and the hammer union as a whole.

Although the present invention has been described in detail, it should be understood that various changes, substitutions, and alterations can be made hereupon without departing from the principle and scope of the invention.

Furthermore, any aforementioned preferred embodiment merely represents one of many potential embodiments for the claimed invention. The extent of potential embodiments should be properly discerned from the claims of the invention. Accordingly, the scope of the present invention should be determined by the following claims and their appropriate legal equivalents.

That which is claimed is:

1. A flowline apparatus, comprising:
    a first tubular member having an external flange;
    a second tubular member having a set of external threads;
    an annular nut having an internal flange and a set of threads, wherein the internal flange of the nut surrounds the first tubular member, and wherein the threads of the nut engage the corresponding threads of the second tubular member;
    at least one arcuate segment circumferentially mated between the internal flange of the nut and the external flange of the first tubular member;
    a flat conical surface on an inner side of the segment in contact with a mating flat conical surface on an outer side of the external flange, the flat conical surfaces being flat when viewed in cross-section;
    a curved conical surface on the inner side of the segment having one end tangentially aligned with and extending from the flat conical surface on the inner side of the segment, and having another end tangentially aligned with and joins an inner cylindrical surface of the segment; and
    a curved conical surface on the external flange having one end tangentially aligned with and extending from the flat conical surface on the external flange, and having another end tangentially aligned with and joins an outer cylindrical surface of the first tubular member, wherein at least a portion of the curved conical surfaces are separated by a clearance.

2. The apparatus of claim 1, wherein an acute angle extends between each of the flat conical surfaces and a plane perpendicular to an axis of the first and second tubular members, and wherein the curved conical surface on the inner side of the segment has a radius that is dependent upon the length of the flat conical surface divided by the quantity of 1 minus the sine of the angle.

3. The apparatus of claim 1, wherein the flat conical surface on the inner side of the segment is at an angle less than 45 degrees relative to a plane perpendicular to an axis of the first and second tubular members.

4. The apparatus of claim 1, wherein the lineal extent of the curved conical surfaces is greater than the lineal extent of the flat conical surfaces.

5. The apparatus of claim 1, wherein the internal cylindrical surface of the segment is spaced from the outer cylindrical surface of the first tubular member by a clearance.

6. The apparatus of claim 1, further comprising:
    a flat conical surface on an outer side of the segment in contact with a mating flat conical surface on an inner side of the internal flange, the flat conical surfaces being flat when viewed in cross-section;
    a curved conical surface on the outer side of the segment having one end tangentially aligned with and extending from the flat conical surface on the outer side of the segment, and having another end tangentially aligned with and joins an outer cylindrical surface of the segment; and
    a curved conical surface on the internal flange having one end tangentially aligned with and extending from the flat conical surface on the internal flange, and having another end tangentially aligned with and joins an inner cylindrical surface of the internal flange.

7. A flowline apparatus, comprising:
a first tubular member having an external flange;
a second tubular member having a set of external threads;
an annular nut having an internal flange and a set of threads, wherein the internal flange of the nut surrounds the first tubular member, and wherein the threads of the nut engage the corresponding threads of the second tubular member;
a plurality of arcuate segments circumferentially mated between the internal flange of the nut and the external flange of the first tubular member;
an inner flat conical interface where the segments contact the external flange, and an outer flat conical interface where the segments contact the internal flange;
an inner curved conical surface on an inner side of the segments having one end tangentially aligned with and extending from the inner flat conical interface, and having another end tangentially aligned with and joins an inner cylindrical surface of the segments;
an outer curved conical surface on an outer side of the external flange having one end tangentially aligned with and extending from the outer flat conical interface, and having another end tangentially aligned with and joins an outer cylindrical surface of the first tubular member;
an inner cylindrical clearance between the segments and the first tubular member; and
wherein an acute angle extends between each of the flat conical surfaces and a plane perpendicular to an axis of the first and second tubular members, and wherein the curved conical surface on the inner side of the segment has a radius that is dependent upon the length of the flat conical surface divided by the quantity of 1 minus the sine of the angle.

8. A flowline apparatus, comprising:
a first tubular member having an external flange;
a second tubular member having a set of external threads;
an annular nut having an internal flange and a set of threads, wherein the internal flange of the nut surrounds the first tubular member, and wherein the threads of the nut engage the corresponding threads of the second tubular member;
a plurality of arcuate segments circumferentially mated between the internal flange of the nut and the external flange of the first tubular member;
an inner flat conical interface where the segments contact the external flange, and an outer flat conical interface where the segments contact the internal flange;
an inner curved conical surface on an inner side of the segments having one end tangentially aligned with and extending from the inner flat conical interface, and having another end tangentially aligned with and joins an inner cylindrical surface of the segments;
an outer curved conical surface on an outer side of the external flange having one end tangentially aligned with and extending from the outer flat conical interface, and having another end tangentially aligned with and joins an outer cylindrical surface of the first tubular member;
an inner cylindrical clearance between the segments and the first tubular member; and
wherein at least a portion of the inner curved conical surface is spaced from at least a portion of the outer curved conical surface by a clearance.

9. A flowline apparatus, comprising:
a first tubular member having an external flange;
a second tubular member having a set of external threads;
an annular nut having an internal flange and a set of threads, wherein the internal flange of the nut surrounds the first tubular member, and wherein the threads of the nut engage the corresponding threads of the second tubular member;
at least one arcuate segment circumferentially mated between the internal flange of the nut and the external flange of the first tubular member;
a flat conical surface on an inner side of the segment in contact with a mating flat conical surface on an outer side of the external flange, the flat conical surfaces being flat when viewed in cross-section;
a curved conical surface on the inner side of the segment having one end tangentially aligned with and extending from the flat conical surface on the inner side of the segment, and having another end tangentially aligned with and joins an inner cylindrical surface of the segment; and
an acute angle extending between each of the flat conical surfaces and a plane perpendicular to an axis of the first and second tubular members, wherein the curved conical surface on the inner side of the segment has a radius that is dependent upon the length of the flat conical surface divided by the quantity of 1 minus the sine of the angle.

10. The apparatus of claim 9, further comprising another curved conical surface having one end tangentially aligned with and extending from the flat conical surface on the external flange, and having another end tangentially aligned with and joins an outer cylindrical surface of the first tubular member, wherein at least a portion of the curved conical surfaces are separated by a clearance.

11. The apparatus of claim 9, wherein the flat conical surface on the inner side of the segment is at an angle less than 45 degrees relative to a plane perpendicular to an axis of the first and second tubular members.

12. The apparatus of claim 9, further comprising another curved conical surface having one end tangentially aligned with and extending from the flat conical surface on the external flange, and having another end tangentially aligned with and joins an outer cylindrical surface of the first tubular member, wherein the lineal extent of the curved conical surfaces is greater than the lineal extent of the flat conical surfaces.

13. The apparatus of claim 9, further comprising another curved conical surface having one end tangentially aligned with and extending from the flat conical surface on the external flange, and having another end tangentially aligned with and joins an outer cylindrical surface of the first tubular member, wherein the internal cylindrical surface of the segment is spaced from the outer cylindrical surface of the first tubular member by a clearance.

* * * * *